US009151244B2

(12) United States Patent
Huber et al.

(10) Patent No.: US 9,151,244 B2
(45) Date of Patent: Oct. 6, 2015

(54) AIRCRAFT JET ENGINE COMPRISING A SYSTEM FOR REDUCING THE NOISE GENERATED BY THE EJECTION OF THE GASES

(75) Inventors: Jerome Huber, Cornebarrieu (FR); Jean Paul Bonnet, Poitiers (FR); Luis Gomes, Poitiers (FR); Remy Maury, Malemort (FR)

(73) Assignees: AIRBUS Operations (S.A.S.), Toulouse (FR); CENTRE NATIONAL DE LA RECHERCHE SCIENTIFIQUE, Paris (FR); UNIVERSITE DE POITIERS, Poitiers (FR)

( * ) Notice: Subject to any disclaimer, the term of this patent is extended or adjusted under 35 U.S.C. 154(b) by 907 days.

(21) Appl. No.: 13/357,065

(22) Filed: Jan. 24, 2012

(65) Prior Publication Data
US 2012/0186224 A1    Jul. 26, 2012

(30) Foreign Application Priority Data

Jan. 24, 2011    (FR) .................................. 11 50542

(51) Int. Cl.
*F02K 1/34*    (2006.01)
*F02K 1/46*    (2006.01)
*F04B 43/02*    (2006.01)

(52) U.S. Cl.
CPC . *F02K 1/34* (2013.01); *B64D 33/06* (2013.01); *F02K 1/46* (2013.01); *F04B 43/025* (2013.01)

(58) Field of Classification Search
CPC ........... F02K 1/34; F02K 1/46; F04B 43/025; B64D 33/06

USPC ........... 60/231, 262–264; 239/127.3, 265.17, 239/265.19, 265.23, 265.25; 181/220, 221
See application file for complete search history.

(56) References Cited

U.S. PATENT DOCUMENTS

| | | | | |
|---|---|---|---|---|
| 5,040,560 | A * | 8/1991 | Glezer et al. ..................... | 137/13 |
| 6,722,581 | B2 * | 4/2004 | Saddoughi ................ | 239/102.2 |
| 7,159,383 | B2 * | 1/2007 | Barton et al. ................ | 60/226.1 |
| 7,174,718 | B2 * | 2/2007 | Bonnet et al. ................... | 60/770 |

(Continued)

FOREIGN PATENT DOCUMENTS

| EP | 1 464 822 A2 | 10/2004 |
|---|---|---|
| EP | 1 464 822 A3 | 10/2004 |

(Continued)

OTHER PUBLICATIONS

French Preliminary Search Report issued Jul. 19, 2011, in French 1150542, filed Jan. 24, 2011 (with English Translation of Categories of Cited Documents).

*Primary Examiner* — Ehud Gartenberg
*Assistant Examiner* — Lorne Meade
(74) *Attorney, Agent, or Firm* — Oblon, McClelland, Maier & Neustadt, L.L.P.

(57) ABSTRACT

An aircraft jet engine comprising a nozzle to eject a gas stream, and a system for reducing the noise generated by the ejection of the gas stream. This system comprises several ducts which each are connected upstream to a recess divided into several chambers and open, downstream, at the outlet of nozzle. In this way, each duct ejects a fluid jet deriving from the recess and which interacts with the gas stream of the engine. The system also comprises a pulsation means for the fluid jet which brings about its ejection at the nozzle outlet and/or modulates its speed by varying the volume contained in the recess.

12 Claims, 5 Drawing Sheets

(56) References Cited

U.S. PATENT DOCUMENTS

| | | | |
|---|---|---|---|
| 7,246,481 B2 * | 7/2007 | Gutmark et al. | 60/204 |
| 8,020,368 B2 * | 9/2011 | Bonnet et al. | 60/262 |
| 8,132,756 B2 * | 3/2012 | Huber et al. | 244/53 R |
| 8,136,767 B2 * | 3/2012 | Cueman et al. | 244/208 |
| 8,157,050 B2 | 4/2012 | Huber et al. | |
| 8,393,139 B2 * | 3/2013 | Huber et al. | 60/264 |
| 8,770,921 B2 * | 7/2014 | Huber et al. | 415/116 |
| 2004/0187474 A1 | 9/2004 | Martens et al. | |
| 2007/0152104 A1 * | 7/2007 | Cueman et al. | 244/198 |
| 2010/0271775 A1 | 10/2010 | Bult et al. | |
| 2011/0027070 A1 | 2/2011 | Huber et al. | |
| 2011/0030341 A1 | 2/2011 | Huber et al. | |

FOREIGN PATENT DOCUMENTS

| | | |
|---|---|---|
| EP | 2 116 730 A2 | 11/2009 |
| EP | 2 116 730 A3 | 11/2009 |
| WO | WO 02/29232 A1 | 4/2002 |

* cited by examiner

AIRCRAFT JET ENGINE COMPRISING A SYSTEM FOR REDUCING THE NOISE GENERATED BY THE EJECTION OF THE GASES

This invention relates to an aircraft jet engine.

In known manner, an aircraft jet engine is in the form of a nacelle in the center of which a turbo-mechanism is positioned.

This nacelle is intended to be mounted beneath the wing group of an aircraft by way of a jet engine nacelle pylon. The turbo-mechanism is composed of a gas generator that drives a fan mounted on the shaft of the gas generator, upstream from the latter along the longitudinal direction of the jet engine nacelle.

The air stream that traverses the nacelle longitudinally partially enters the gas generator and takes part in the combustion. This stream is called primary stream and is ejected at the outlet of the generator. The part of the air stream entering the nacelle and which does not traverse the gas generator is carried along by the fan. This stream, called secondary stream, flows in an annular passage, concentrically in relation to the primary stream.

During takeoff phases, the gas stream that is ejected (primary and secondary stream) takes on very high speeds. At these speeds, the meeting of the ejected stream with the surrounding air, just as the meeting of the primary and the secondary stream generate a considerable noise.

There is known from international application WO2006/013243 a fluidic device for reducing the noise generated by an aircraft jet engine. This device comprises means for disturbing the primary stream consisting of at least one pair of ducts distributed at the periphery of a nozzle and opening at the outlet of the said nozzle to generate a jet at the outlet of each duct. These jets form a triangle of interaction with the stream.

It has been shown that in order to reduce the noise coming from the engine in the full spectrum of frequencies, it is necessary to pulse a jet with an excitation frequency three times greater than the basic frequency of the gas stream. Thus there is a need to design a device allowing a high-frequency pulsation so as to obtain a greater reduction of noise.

Moreover, the ongoing injection of fluid makes it necessary to take the said fluid, for example compressed air, continuously from the engine or from an alternative source, which may reduce the output of the engine. Thus there is a need to reduce the high-frequency noise caused by ejection of the gas stream or streams at the outlet of the jet engine nacelle of an aircraft, in particular when the dimensions of the engine are substantial, without having to take a gas stream continuously from the engine or from an independent source.

To this end, the invention has as an object an aircraft jet engine, comprising a nozzle intended to eject a gas stream and a system for reducing the noise generated by the ejection of the gas stream, characterized in that the said system comprises:
  at least one duct which, on the one hand, is connected upstream to at least one recess divided into several chambers and, on the other hand, opens, downstream, at the nozzle outlet so as to eject at least one fluid jet intended to interact with the ejected gas stream,
  at least one means for pulsation of the fluid jet able to bring about ejection of the fluid jet at the nozzle outlet and/or to modulate the speed of the fluid jet by varying the volume contained in the said at least one recess,
the system being configured for balancing the static pressures between the chambers.

Varying the volume in the recess or recesses upstream makes it possible to pulse one or more jets at a chosen frequency and speed in an appropriate manner, in particular at a frequency at least three times greater than the basic frequency of the ejected gas stream. The jet or jets pulsed in this way interact with the ejected gas stream, contributing toward reducing the noise of the jet engine more effectively.

Balancing the static pressures between the chambers makes it possible to obtain the same static pressure on the walls defining the chambers, and this irrespective of their nature.

The pulsation method or methods comprise in particular a piezoelectric device which is able to cause the volume of the recess or recesses filled with fluid to vary.

This variation in volume creates a pressure differential between the recess and the ambient air, thus giving rise to an injection of air.

In this way, a first operating mode, referred to as "synthetic jet," makes it possible, when the need arises, to pulse a jet of fluid taken from an outside source of any pressure at a given speed. This operating mode is particularly advantageous in the case where the fluid is air and the outside source the ambient air. In fact, in this case, the electrical requirement is the only energy supply necessary for implementing the pulsation, the air not needing to be compressed. This first operating mode thus consumes less energy in comparison with a system having continuous pulsations.

According to one characteristic, the piezoelectric device for volume variation comprises at least one piezoelectric deformable membrane disposed in the said at least one recess. This membrane is excited by an electric signal, typically periodic and preferably sinusoidal.

When the fluid is air, the pulsation means further comprises a compressed air supply which requires a predetermined pressure.

The compressed air in particular may be taken from axial compressors of the engine of the turbojet engine of the aircraft if the latter is provided with same, preferably so as to reduce the flow rate of the latter by less than 1%.

This compressed air supply may be used when it is necessary to apply more excitation to the flow of the stream at the jet engine outlet in order to control the development of the mixture layer. In this case, the volume variation generated by the deformation of the piezoelectric membranes makes it possible to modulate the speed of the jet, preferably periodically. This second operating mode is called "jet modulation."

According to one characteristic, the pulsation means is driven by a servo-mechanism that makes it possible to have it switch over from one mode to the other.

According to one characteristic, the division of the recess into several chambers is achieved by the presence of at least one piezoelectric deformable membrane. The said at least one membrane is disposed between a central chamber and the inner wall of the recess.

In order to increase the amplitude of modulation of the speed of the jet at the jet engine outlet, the variation of the volume contained in the recess or recesses is accomplished by exciting either the mechanical resonance of the piezoelectric deformable membrane or membranes, or the mechanical resonance of the piezoelectric deformable membrane or membranes and the acoustic resonance of the recess or recesses.

According to one characteristic, the acoustic resonance of the said at least recess is excited by amplitude modulation of a carrier wave of the electrical signal intended to excite the piezoelectric deformable membrane or membranes.

Balancing of the static pressures between the chambers makes it possible, in particular in the embodiment referred to above, to achieve the same static pressure on each of the membranes, which facilitates their excitation and thus control of the volume of the recess or recesses. Variation of the volume of the recess or recesses is maximal because the membranes react identically to the electric excitation pulse.

More particularly, balancing of the static pressures between the chambers is achieved by communication of the chambers with each other at the inlet for the fluid in the recess or recesses.

In order to simplify the implementation of the system, the recess or recesses are divided into a central chamber and two side chambers by the presence of two piezoelectric deformable membranes disposed between the central chamber and the inner wall of the recess or recesses.

More particularly, a pair of piezoelectric deformable membranes is disposed on either side of the central chamber, the space between each membrane and the inner wall of the recess or recesses forming two side chambers respectively.

In order to achieve better performance on noise reduction, in particular on a large scale, the noise reduction system comprises several pulsation means disposed in parallel.

In this case, the number of pulsation means is chosen according to the desired flow for the fluid jet taking into account the flow of a single pulsation means.

In a specific embodiment, the noise reduction system comprises several pulsation means disposed in parallel and which are able to bring about ejection of the fluid jet at the nozzle outlet, that is, several pulsation means operating in "synthetic jet" mode.

The advantage of such an embodiment is not to need any compressed-air supply.

In another embodiment, the noise reduction system comprises several pulsation means disposed in parallel and which are able to modulate the speed of the fluid jet by varying the volume contained in the said at least one recess, that is, several pulsation means operating in "jet modulation" mode.

Such an embodiment increases the effect of the jets on the gas stream ejected by the engine.

The invention also has as an object an aircraft comprising at least one aircraft jet engine in accordance with the brief explanation set forth above.

Other characteristics and advantages will become apparent in the course of the description that is going to follow, provided by way of non-limitative example and presented with reference to the attached drawings, on which:

Figure 1:
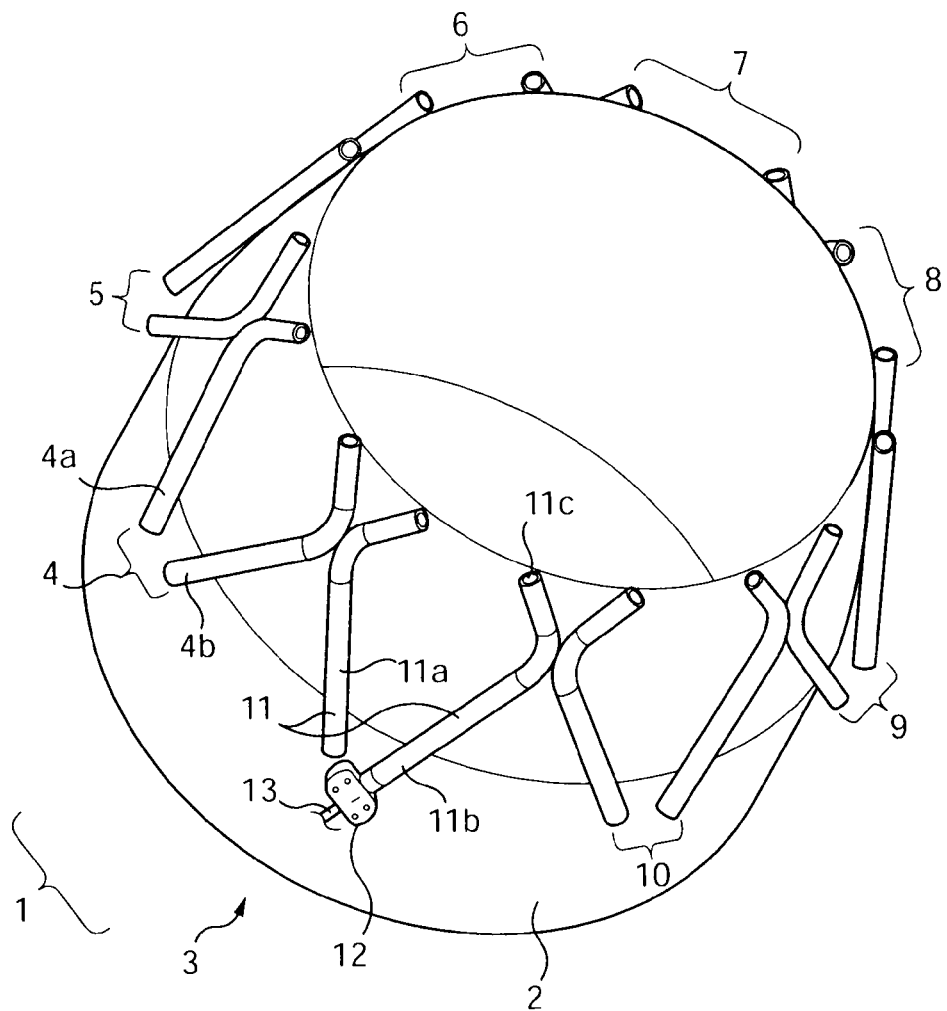
FIG. 1 is a schematic view in perspective of a downstream end of a nacelle wall equipped with a noise reduction system according to one embodiment of the invention.

As shown on FIG. 1, the wall of a jet engine 1 is equipped with a noise reduction system according to the invention. Jet engine 1 comprises a nozzle 2 into which there flows a gas stream that is ejected at the downstream end of the wall of nozzle 2. Noise reduction system 3 comprises fluidic devices 4, 5, 6, 7, 8, 9, 10, 11, each able to eject a fluid jet. These devices comprise pairs of ducts (4a, 4b . . . 11a, 11b) for example evenly distributed at the outside periphery of the wall of nozzle 2. For example, each device comprises a pair of ducts. Each of the ducts comprises, for example, a first straight part, an elbow, and a second straight part the downstream outlet opening of which is directed toward the end of the nozzle. Means for pulsation of the jets are located at the upstream inlet of the fluidic devices. For the sake of clarity, a single pulsation means 12 is shown on FIG. 1 at the inlet of duct 11b. Each duct, however, is equipped with a pulsation means.

Duct 11b, on the one hand, is connected upstream to at least one recess situated inside pulsation means 12 (FIG. 1) and, on the other hand, opens downstream, at the nozzle outlet, through an emerging opening 11c via which a fluid jet is ejected. A fluid supply duct 13 (partially shown on FIG. 1) connects pulsation means 12 to a fluid source not shown (for example for compressed air). Other arrangements of noise reduction system 3 of course are conceivable.

Figure 2:
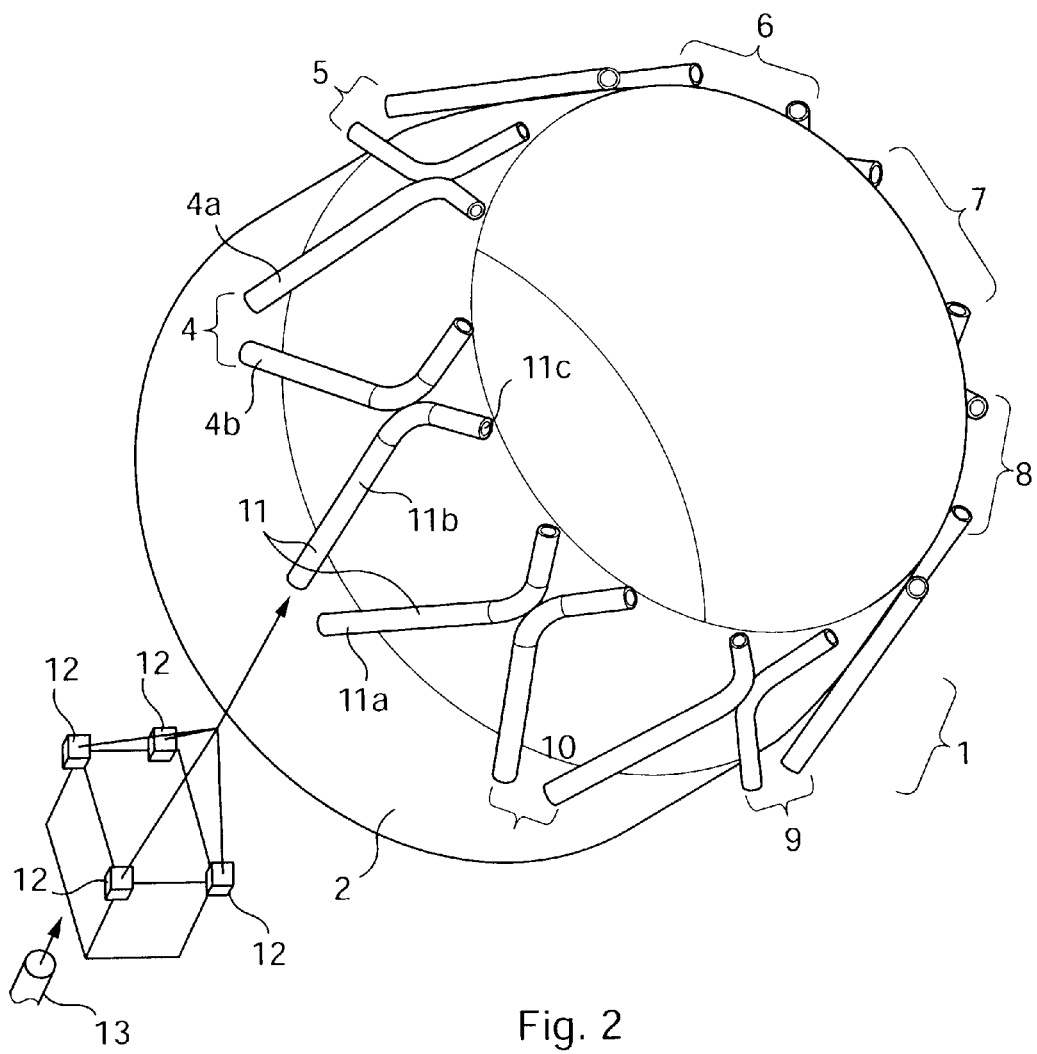
FIG. 2 is a schematic view in perspective of a detail of a noise reduction system comprising several pulsation means according to the invention.

FIG. 2 illustrates an embodiment of a noise reduction system comprising several pulsation means 12.

In this embodiment, pulsation means 12 are arranged in parallel and cooperate so as to pulse their fluid jets into the same duct 11b.

It will be noted that the noise reduction system of FIG. 2 may comprise several pulsation means for each duct or several pulsation means for two ducts of the same fluidic device or for several ducts of several fluidic devices. The arrangement of the pulsation means of each fluidic device may or may not be identical for all the devices.

They furthermore are supplied, if need be, by the same compressed air source. This supply is described later on.

Figure 3:
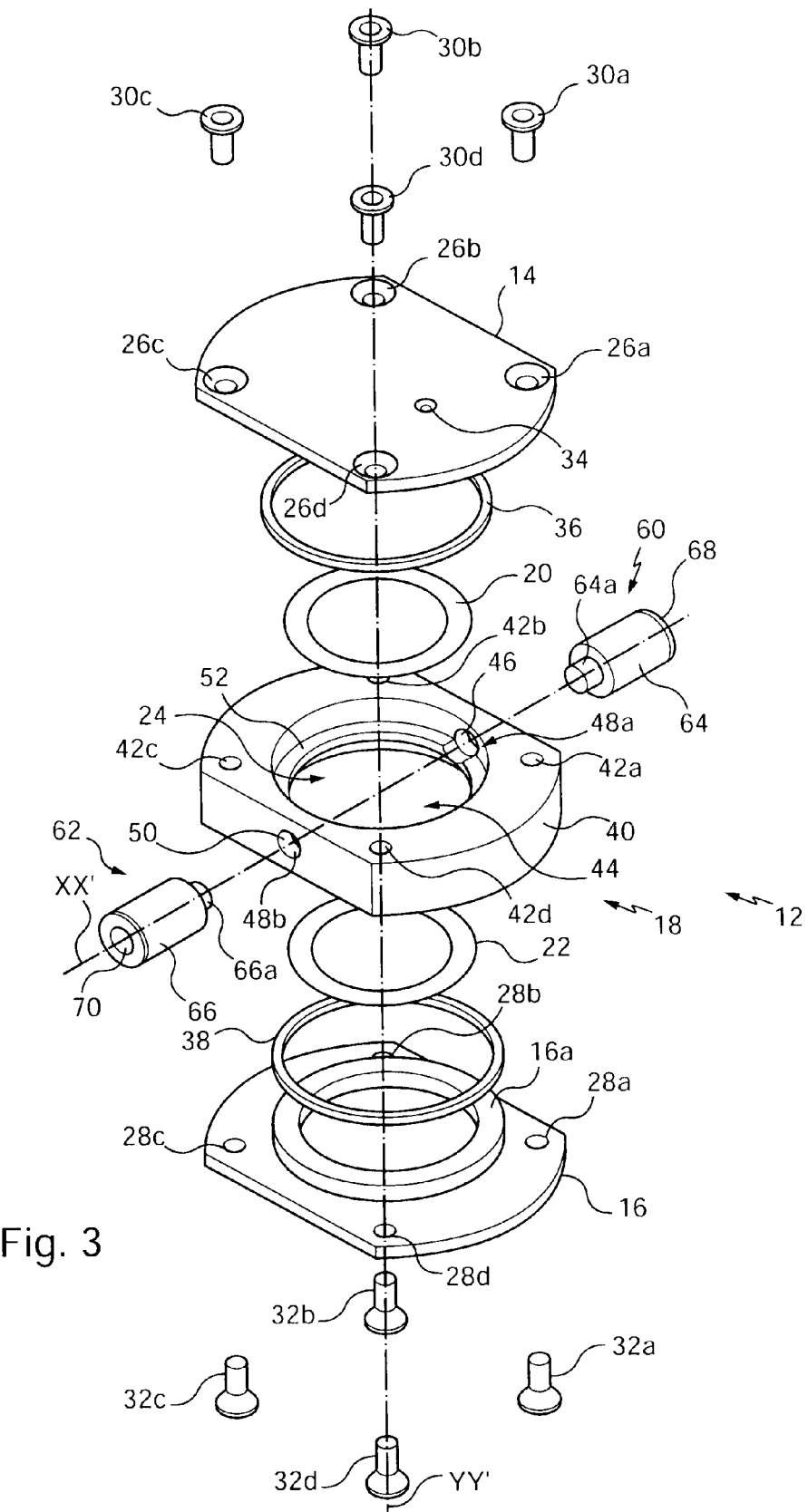
FIG. 3 is an exploded view of a pulsation means according to one embodiment.

As shown on FIG. 3, a pulsation means 12 comprises two cowls 14, 16 which are disposed opposite one another along a direction YY' perpendicular to the axis of the jet XX'. Pulsation means 12 also comprises a central part 18 comprising piezoelectric deformable membranes, for example two, 20, 22 (piezoelectric device) and a recess 24 defined by these membranes as will be seen farther on. Cowls 14, 16 each comprise two straight parallel sides connected by two sides in an arc of a circle, so that their shape is more or less rounded rectangular. These cowls 14, 16 respectively comprise emerging threaded holes 26a-d and 28a-d drilled along the direction YY', for example four in number. These threaded holes are distributed, for example, at the four corners of cowls 14, 16 and are intended to accommodate screws 30a-d and 32a-d. Cowls 14, 16 may also have a hole 34 drilled along the direction YY', allowing passage of electric cables not shown on FIG. 3. These holes 34 are located for example near the central portion of cowls 14, 16. The hole 34 of cowl 16 is not shown on FIG. 3.

The central portion of the inside surface of each of cowls 14, 16 comprises, in the direction YY', an annular extension 16a (not visible for cowl 14) intended to be inserted respectively in the upper part and the lower part of central part 18, which each possess a hollowed-out portion with shape complementary to the corresponding annular extension. These two (axial) annular extensions each comprise on their outer part a peripheral circular housing each intended to accommodate an O ring, 36, 38 respectively.

Figure 4:
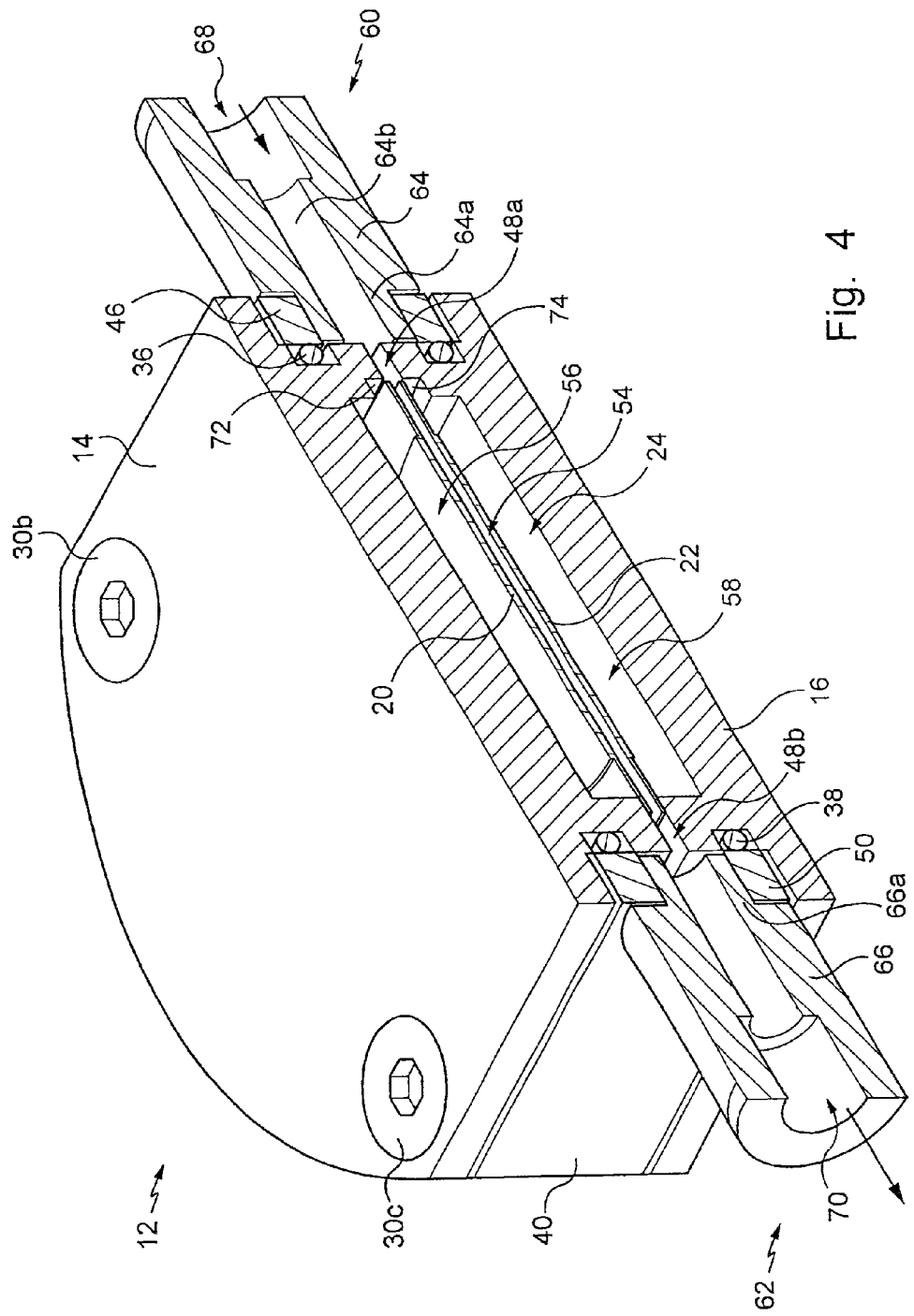
FIG. 4 is a schematic view in perspective of a vertical section of the pulsation means of FIG. 3.

During assembly of the various elements, cowls 14, 16 rest in the direction YY' respectively on the upper and lower parts of body 40 of central part 18, thus defining an inner recess 24 (FIG. 4).

Body 40 comprises two straight sides connected by two sides in an arc of a circle, so that its shape is more or less rounded rectangular, just like cowls 14, 16 which cooperate therewith.

Body 40 has emerging threaded holes 42a-d drilled in the direction YY', for example four in number. These threaded holes preferably are distributed at the four corners of body 40 and are intended to receive screws 30a-d on the one hand, in their upper part, and screws 32a-d on the other hand, in their lower part.

Body 40 also has a traversing opening 44 drilled in this same direction YY', advantageously situated in the central part of the body. As for the side part of body 40, it has, drilled along the axis XX', on the air-inlet side, a first threaded hole 46 coming out into central opening 44 through a duct 48a hereinafter called "air inlet."

Likewise, a second hole 50 is drilled on the jet-outlet side along the axis XX', and comes out into opening 44 through a duct 48b hereinafter called "jet outlet." The two ducts 48a and 48b are aligned with one another along the direction XX', just like threaded holes 46, 50.

Moreover, body 40 is provided with an inner annular edge 52 arranged on the inner wall defining opening 44, preferably situated at its center, and which is interrupted at ducts 48a and 48b.

During assembly of the components making up pulsation means 12, membranes 20 and 22 come to bear respectively on either side of annular edge 52.

According to the embodiment presented in FIG. 3 and in FIG. 4, recess 24 is divided into a central chamber 54 situated between the two membranes, and two side chambers 56 and 58 on either side thereof. As illustrated on FIG. 4, side chamber 56 is situated between membrane 20 and the inner wall of the cowl situated inside the annular extension (not visible on the Figure) of cowl 14, while side chamber 58 is situated, symmetrically, between membrane 22 and the inner wall of the cowl situated inside axial annular extension 16a of cowl 16. The detail of these chambers will be described farther on.

Once membranes 20, 22 are disposed on either side of annular edge 52, annular extensions 16a (along YY') of cowls 14, 16 come to grip membranes 20, 22, when the need arises, over a peripheral zone thereof arranged against edge 52, except in the zone situated at ducts 48a and 48b. Cowls 14, 16 and main body 40 then are assembled by using screws 30a, 30b, 30c, 30d and 32a, 32b, 32c, 32d and O rings 36, 38. It will be noted that other alternative assembly means may be used.

Finally, the two threaded holes 46, 50 allow the arrangement of outer ducts 60 and 62. These ducts consist of a main tubular part 64, 66 and a threaded secondary tubular part of lesser diameter 64a, 66a.

Threaded tubular parts 64a, 66a are screwed into threaded holes 46, 50 respectively. Threaded tubular parts 64a, 66a communicate with recess 24 via air inlet 48a and jet outlet 48b respectively. The supply or inlet duct 60 is provided with an inlet opening 68, unlike air inlet 48a. This opening is connected to the system, not shown, for supply of air (compressed or not), for example via duct 13 of FIG. 1 for fluidic device 11. The air may originate in particular from the axial compressors of the engine of the turbo-jet engine of the aircraft. As for ejection or outlet duct 62, it is provided with an outlet opening 70, unlike threaded tubular part 66a, and therefore jet outlet 48b. The outlet opening is connected to one of fluidic devices 4, 5, 6, 7, 8, 9, 10, 11 shown on FIG. 1.

The components described above are shown assembled in FIG. 4.

On FIG. 4, screws 30a, 30d and 32a-d for interlocking the cowls and the body are not shown. Ducts 60, 62 are inserted into threaded holes 46, 50 respectively and fastened to body 40 by screwing by way of threaded tubular part 64a, 66a respectively. It will be noted that air inlet 48a is made up of a straight duct widening in recess 24 by virtue of two shoulders 72, 74, arranged in the axial extension of each cowl, so that each duct 48a communicates directly with the three chambers 54, 56 and 58. In this way, the air is able to enter main chamber 54 and the two side chambers 56, 58 at the same time. This aspect will be explained in detail farther on. It will be noted that conversely jet outlet 48b is a straight duct without a shoulder; that is to say that the two membranes are in contact with the two annular extensions of the cowls to the right of duct 48b. In this way, only the air stream deriving from main chamber 54 is able to diffuse into duct 62, the air present in the side chambers not communicating directly with duct 48b.

Figure 5:
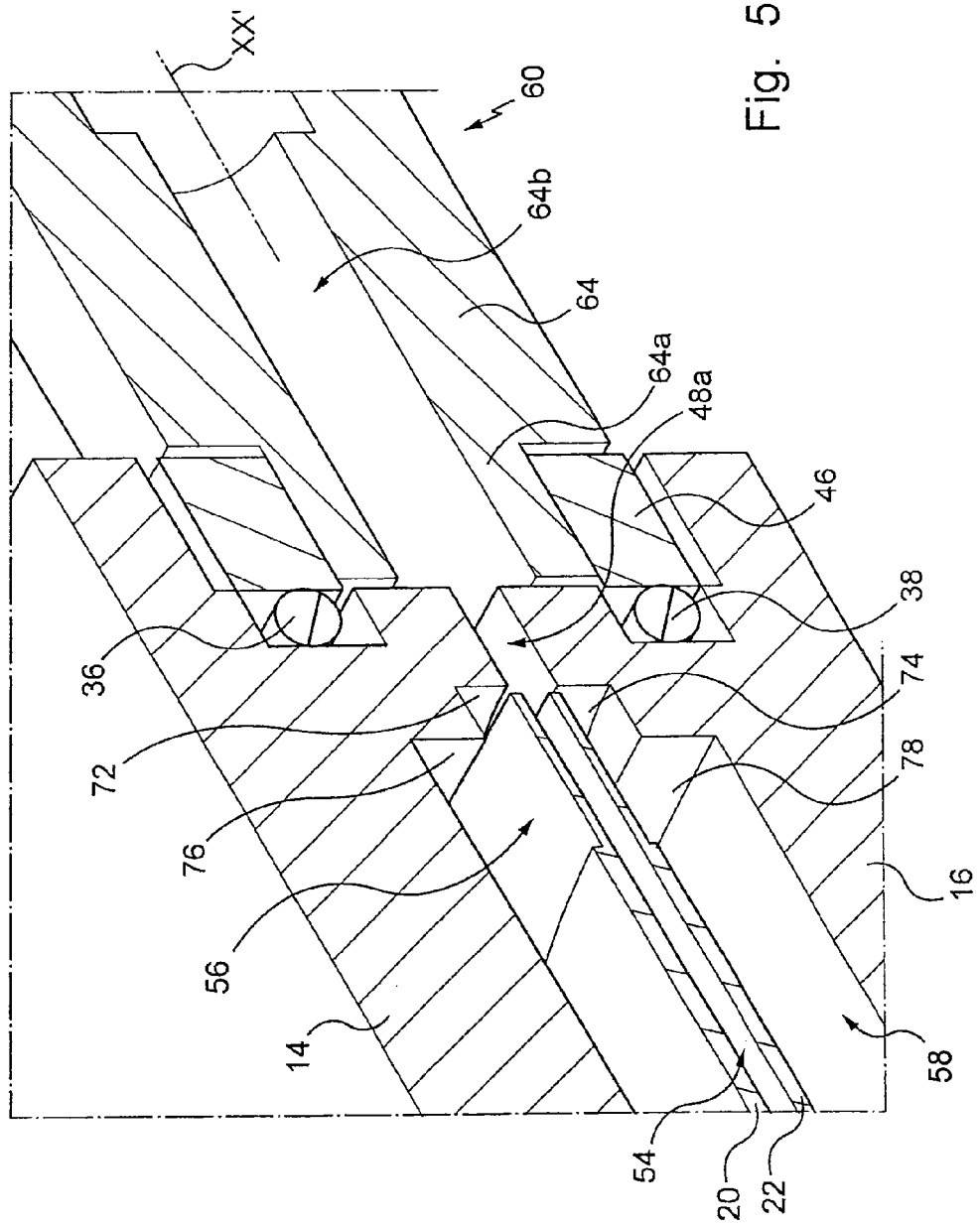
FIG. 5 is an enlargement of FIG. 4 around the inlet of the pulsation means.

The detail of air inlet 48a is illustrated on FIG. 5. The compressed air or air taken from the engine enters via channel 64b of main tubular part 64 of duct 60, which opens into air inlet 48a. This air inlet in communication with recess 24 comprises two shoulders 72 and 74 so that main chamber 54 and side chambers 56, 58 communicate with each other. This makes it possible in particular to ensure balancing of the static pressures on each of the membranes. Two other shoulders 76, 78 are located in the continuation of shoulders 72, 74 along the axis XX', respectively, so as to increase the axial height (YY') of the two chambers 56, 58. In this way, side chambers 56, 58 each are of more or less cylindrical shape. As for central chamber 54, it is of cylindrical shape.

In the operating mode producing a "synthetic jet," the air deriving from duct 60 passes successively into jet inlet 48a, then into chambers 54, 56 and 58. Once the air is introduced into the chambers, a servo-mechanism known in itself (not shown) which may in particular comprise a movable valve, imperviously isolates on the one hand the three chambers from each other and, on the other hand, the chambers for fluid supply. An electric signal is generated by an electronic system (not shown) consisting of a variable frequency generator and a module for amplification of the signal and is applied to the piezoelectric deformable membranes 20, 22. This signal causes the volume of central chamber 54 to vary by exciting the acoustic resonance of membranes 20, 22. It will be noted that in other embodiments, the volume variation may be implemented in another part of the recess. In order to increase the amplitude of the deformation of membranes 20, 22, the acoustic resonance of recess 24 advantageously is excited by amplitude modulation of a carrier wave of the electric signal intended to excite membranes 20, 22. The volume variation of central chamber 54 has the effect of increasing the pressure within same. This pressure difference between the air in the central chamber and the outside air pushes the air contained in central chamber 54 into outlet duct 62. It then passes, for example, via duct 11b to which it is connected to interact with the gas stream at the outlet of nozzle 2. The air is evacuated through outlet opening 11c in the form of a jet, under a pressure preferably, for example, lower than two bars in order not to damage fluidic devices 4-11.

In the operating mode called "jet modulation," the air supplied via duct 60 is taken from a compressed air circuit generally deriving from the engine so as to control its pressure.

In this case, the valve of the servo-mechanism allows the compressed air to pass into each of the chambers so that the air may circulate freely between them.

Just as in "synthetic jet" mode, the resonance of membranes 20, 22 and the acoustic resonance of recess 24 are excited so as to cause the volume of membranes 20, 22 to vary and thus cause the volume in central chamber 54 to vary. In this operating mode, however, it is the constant intrinsic pressure of the compressed air supplied continuously which propels it out of the recess through ejection or outlet duct 62. The function of the membranes is to increase and to reduce the speed of the air periodically. The cyclic effect obtained in this way is described as "jet modulation."

Other forms of membranes and chambers may be adopted. Thus, in a second embodiment not shown, recess 24 is divided into only two chambers. The recess defined between the two cowls, inside body 40, has a more or less cylindrical general shape, the axis of the cylinder being positioned along the axis XX'. A cylindrical central duct of axis XX' divides the recess into two chambers: an inner central chamber at the duct and a peripheral chamber surrounding the central duct. In this embodiment, a single piezoelectric deformable membrane surrounds the central duct.

As for the embodiment of FIG. 4, the central duct has an end that is in contact with the axial extensions of the cowls at duct 48b. The other opposite end disposed facing duct 48a, however, is free so as to allow introduction of fluid into the annular peripheral chamber.

It will be noted that alternatively the central duct is eliminated and the single membrane is configured so as to divide the recess into two chambers.

The invention claimed is:

1. An aircraft jet engine, comprising:
a nozzle including a nozzle outlet to eject a gas stream;
at least one duct with a downstream end which opens downstream at the nozzle outlet so as to eject at least one fluid jet to interact with the ejected gas stream; and
at least one pulsation means for ejecting a respective fluid jet from said at least one fluid jet at the nozzle outlet, the at least one pulsation means including two cowls which face each other along a first axis, the two cowls connected together defining at least part of a recess, the recess divided into several chambers by at least two deformable membranes, and the at least one pulsation means includes a fluid inlet and a fluid outlet on a second axis that is perpendicular to the first axis, the fluid outlet connected to an upstream end of the at least one duct, wherein a speed of the respective fluid jet is modulated by varying a volume of at least one of said several chambers.

2. The aircraft jet engine according to claim 1, wherein the at least two deformable membranes comprise a piezoelectric device that varies the volume of at least one of said several chambers.

3. The aircraft jet engine according to one of claims 1 and 2, wherein the pulsation means further comprises a compressed air supply.

4. The aircraft jet engine according to claim 1, wherein a volume variation inside the said at least one of said several chambers is achieved by exciting either a mechanical resonance of the at least two deformable membranes, or the mechanical resonance of the at least two deformable membranes and an acoustic resonance of the at least one recess.

5. The aircraft jet engine according to claim 4, wherein the acoustic resonance of the at least one recess is excited by amplitude modulation of a carrier wave of an electric signal to excite the at least two deformable membranes.

6. The aircraft jet engine according to claim 1, wherein the fluid inlet includes a shoulder in each of the two cowls so that the fluid inlet and each of the several chambers are in open fluidic communication with each other.

7. The aircraft jet engine according to claim 1, wherein the at least one recess is divided into a central chamber and two side chambers by the at least two deformable membranes.

8. The aircraft jet engine according to claim 7, wherein the at least two deformable membranes contact annular extensions of the fluid outlet and a fluid in the central chamber communicates directly with the fluid outlet.

9. The aircraft jet engine according to claim 1, wherein the at least one pulsation means includes several pulsation means disposed in parallel.

10. The aircraft jet engine according to claim 1, wherein the at least one pulsation means includes at least two pulsation means disposed in parallel.

11. The aircraft jet engine according to claim 1, wherein the at least one pulsation means includes at least two pulsation means disposed in parallel, each of which modulate the speed of the respective fluid jet by varying a volume contained in each respective at least one of said several chambers.

12. An aircraft comprising:
a jet engine including:
a nozzle including a nozzle outlet to eject a gas stream;
at least one duct with a downstream end which opens downstream at the nozzle outlet so as to eject at least one fluid jet to interact with the ejected gas stream; and
at least one pulsation means for ejecting a respective fluid jet from said at least one fluid jet at the nozzle outlet, the at least one pulsation means including two cowls which face each other along a first axis, the two cowls connected together defining at least part of a recess, the recess divided into several chambers by at least two deformable membranes, and the at least one pulsation means including a fluid inlet and a fluid outlet on a second axis that is perpendicular to the first axis, the fluid outlet connected to an upstream end of the at least one duct, wherein a speed of the respective fluid jet is modulated by varying a volume of at least one of said several chambers.

* * * * *